United States Patent
Nguyen et al.

(10) Patent No.: US 9,906,605 B2
(45) Date of Patent: Feb. 27, 2018

(54) ENHANCED DNS-BASED SERVICE DISCOVERY IN AN INTERNET OF THINGS (IOT) ENVIRONMENT

(71) Applicant: Qualcomm Connected Experiences, Inc., San Diego, CA (US)

(72) Inventors: Phil Tien Nguyen, San Diego, CA (US); Ashutosh Aggarwal, San Diego, CA (US)

(73) Assignee: QUALCOMM Connected Experiences, Inc., San Diego, CA (US)

( * ) Notice: Subject to any disclaimer, the term of this patent is extended or adjusted under 35 U.S.C. 154(b) by 259 days.

(21) Appl. No.: 14/695,718

(22) Filed: Apr. 24, 2015

(65) Prior Publication Data

US 2015/0341446 A1 Nov. 26, 2015

Related U.S. Application Data

(60) Provisional application No. 62/002,739, filed on May 23, 2014.

(51) Int. Cl.
*H04L 29/08* (2006.01)
*H04L 29/12* (2006.01)
*H04W 4/00* (2018.01)

(52) U.S. Cl.
CPC .......... *H04L 67/16* (2013.01); *H04L 61/1511* (2013.01); *H04L 61/1541* (2013.01); *H04L 67/12* (2013.01); *H04W 4/005* (2013.01); *H04W 4/008* (2013.01)

(58) Field of Classification Search
CPC .......... H04L 29/08648; H04L 41/5058; H04L 61/1511; H04L 61/1541; H04L 67/12; H04L 67/16; H04W 4/005; H04W 4/008
See application file for complete search history.

(56) References Cited

U.S. PATENT DOCUMENTS

2004/0120344 A1* 6/2004 Sato ........................ H04L 67/16
370/465
2004/0203891 A1* 10/2004 Cole ....................... H04L 67/16
455/456.1

(Continued)

OTHER PUBLICATIONS

"Bonjour Overview", Apple Developer, Apr. 23, 2013, pp. 1-39.*

(Continued)

*Primary Examiner* — Vivek Srivastava
*Assistant Examiner* — William C McBeth
(74) *Attorney, Agent, or Firm* — Neugeboren ODowd PC

(57) ABSTRACT

A system and method for discovering services in an Internet of Things (IoT) environment are disclosed. The method may include providing service-feature information from a consumer app to a query service that is indicative of a service provided by a remotely located provider app and incorporating the service-feature information into resource records of an additional information section of a multicast domain name service (mDNS) message. The message is multicasted to other IoT devices, and a response message is received from at least one provider device. The additional information section of the response message is then analyzed to determine whether a service provided by the at least one provider device meets criteria defined by the service-feature information.

14 Claims, 13 Drawing Sheets

(56) References Cited

U.S. PATENT DOCUMENTS

| | | | | |
|---|---|---|---|---|
| 2004/0215707 | A1* | 10/2004 | Fujita | H04L 61/1511 709/201 |
| 2004/0221007 | A1* | 11/2004 | Roe | H04L 67/16 709/203 |
| 2004/0267876 | A1* | 12/2004 | Kakivaya | H04L 67/16 709/200 |
| 2005/0266879 | A1* | 12/2005 | Spaur | H04L 67/16 455/556.2 |
| 2006/0128364 | A1* | 6/2006 | Costa-Requena | H04L 67/16 455/414.3 |
| 2009/0210530 | A1* | 8/2009 | Modi | H04L 67/16 709/226 |
| 2010/0233960 | A1* | 9/2010 | Tucker | H04L 61/1511 455/41.2 |
| 2013/0201503 | A1* | 8/2013 | Miller | G06F 3/1204 358/1.13 |
| 2013/0275570 | A1* | 10/2013 | Treuhaft | H04L 61/1511 709/223 |
| 2014/0089478 | A1* | 3/2014 | Seed | H04W 4/005 709/222 |
| 2014/0214958 | A1* | 7/2014 | Cheshire | H04L 61/1511 709/204 |
| 2014/0258395 | A1* | 9/2014 | Tng | H04L 67/16 709/204 |
| 2014/0268235 | A1* | 9/2014 | Chiou | H04L 67/16 358/1.15 |
| 2014/0359148 | A1* | 12/2014 | Cherian | H04L 67/16 709/229 |
| 2015/0206190 | A1* | 7/2015 | Lee | H04L 67/16 705/14.64 |
| 2015/0222474 | A1* | 8/2015 | Hartley | H04L 29/08648 370/338 |
| 2016/0036762 | A1* | 2/2016 | Droms | H04L 61/1541 709/224 |
| 2016/0337837 | A1* | 11/2016 | Keranen | H04L 67/16 |

OTHER PUBLICATIONS

Cheshire et al., "Multicast DNS", Internet Engineering Task Force RFC 6762, Feb. 2013.*
Jara et al., "Light-weight multicast DNS and DNS-SD (lmDNS-SD): IPv6-based resource and service discovery for the Web of Things", Sixth International Conference on Innovative Mobile and Internet Services in Ubiquitous Computing (IMIS), Jul. 2002, pp. 731-738.*
Jeong et al., "DNS Name Service based on Secure Multicast DNS for IPv6 Mobile Ad Hoc Networks", The 6th International Conference on Advanced Communication Technology, vol. 1, Feb. 2004, pp. 3-7.*
Niemueller, "Instant Networking and Dynamic Service Discovery", Rheinisch-Westfalische Technische Hochschule Aachen, 2006.*
Villaverde et al., "Service Discovery Protocols for Constrained Machine-to-Machine Communications", IEEE Communications Surveys & Tutorials, vol. 16, No. 1, First Quarter 2014, pp. 41-60.*
"Web Services Dynamic Discovery (WS-Discovery) Version 1.1", OASIS, Jul. 2009, pp. 1-50.*
Djamaa et al., "Towards Scalable DNS-Based Service Discovery for the Internet of Things", International Conference on Ubiquitous Computing and Ambient Intelligence, Dec. 2014, pp. 432-435.*
Ververidis et al., "Service Discovery for Mobile Ad Hoc Networks—A Survey of Issues and Techniques", IEEE Communications Surveys & Tutorials, vol. 10, No. 3, 2008, pp. 30-45.*

* cited by examiner

ENHANCED DNS-BASED SERVICE DISCOVERY IN AN INTERNET OF THINGS (IOT) ENVIRONMENT

CLAIM OF PRIORITY UNDER 35 U.S.C. §119

The present Application for Patent claims priority to Provisional Application No. 62/002,739 entitled "ENHANCED DNS-BASED SERVICE DISCOVERY IN AN INTERNET OF THINGS (IoT) ENVIRONMENT" filed May 23, 2014, and assigned to the assignee hereof and hereby expressly incorporated by reference herein.

FIELD

Embodiments relate to a domain name system (DNS) service discovery in an Internet of Things (IoT) environment.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. The numerous IoT devices provide a variety of services that are discoverable utilizing known techniques including domain name service based service discovery (DNS-SD). DNS-SD does enable an IoT client device to query other IoT devices to discover the services that are available, but the existing framework for clients to query other IoT devices produces broad searches that result in many responses from the other IoT devices. In addition, a querying device often times must establish a session with a responder device to retrieve more information about the services provided by the responder. And if the services are not of interest to the querying device, the querying device must disconnect and continue the discovery process. Thus, existing service discovery methodologies are prone to overly broad responses that increase network traffic and may cause substantial delays.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One aspect may be characterized as an Internet of Things (IoT) device that includes a consumer app, a query service configured to obtain service-feature information regarding a service provided by a provider app, and an enhanced multicast domain name service (mDNS) component. The enhanced mDNS component is configured to incorporate the service-feature information into resource records of an additional information section of an mDNS message. The IoT device also includes a transceiver to transmit the mDNS message and receive a response message from at least one other IoT device.

Another aspect may be characterized as a method of operating a consumer Internet of Things (IoT) device deployed in a local IoT environment. The method includes providing service-feature information from a consumer app to a query service that is indicative of a service provided by a remotely located provider app, incorporating the service-feature information into resource records of an additional information section of a multicast domain name service (mDNS) message, and multicasting the message to other IoT devices. A response message is received from at least one provider device and an additional information section of the response message is analyzed to determine whether a service provided by the at least one provider device meets criteria defined by the service-feature information.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
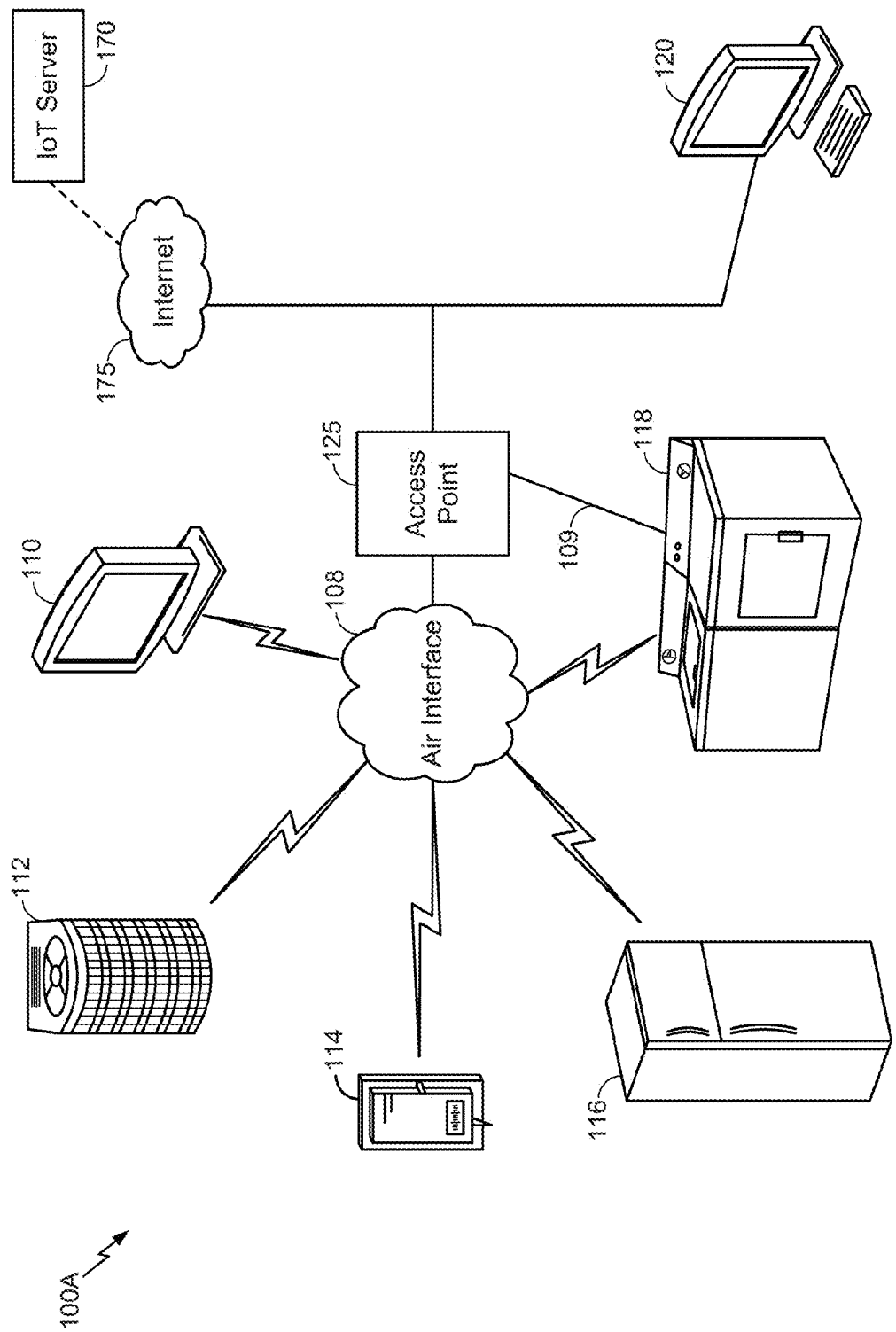
FIG. 1A illustrates a high-level system architecture of a wireless communications system in accordance with an aspect of the disclosure.

Various aspects are disclosed in the following description and related drawings to show specific examples relating to service discovery relative to Internet of Things (IoT) devices. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a BLUETOOTH wireless-interface-identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or WI-FI or 802.11-based network). The computer 120 may have a wired connection to the Internet 175, such as a direct connection to a modem or router, which, in an example, can correspond to the access point 125 itself (e.g., for a WI-FI router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as a FIOS telecommunication system, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the wired connection 109. Alternatively, or additionally, some or all of IoT devices 110-120 may be configured with a communication interface independent of air interface 108 and wired connection 109. For example, if the air interface 108 corresponds to a WI-FI interface, certain of the IoT devices 110-120 may have BLUETOOTH or NFC interfaces for communicating directly with each other or other BLUETOOTH or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
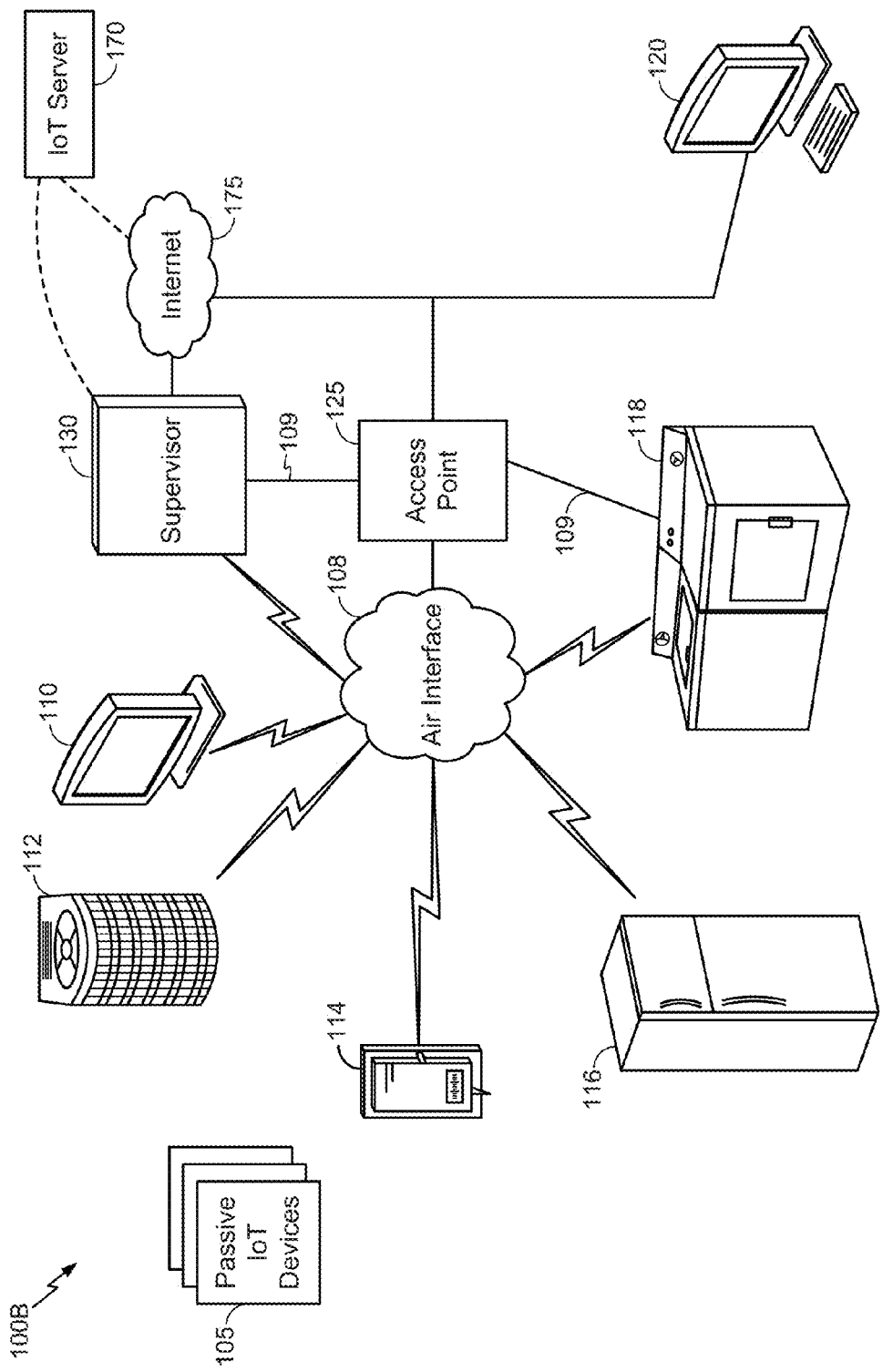
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, BLUETOOTH devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RF or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
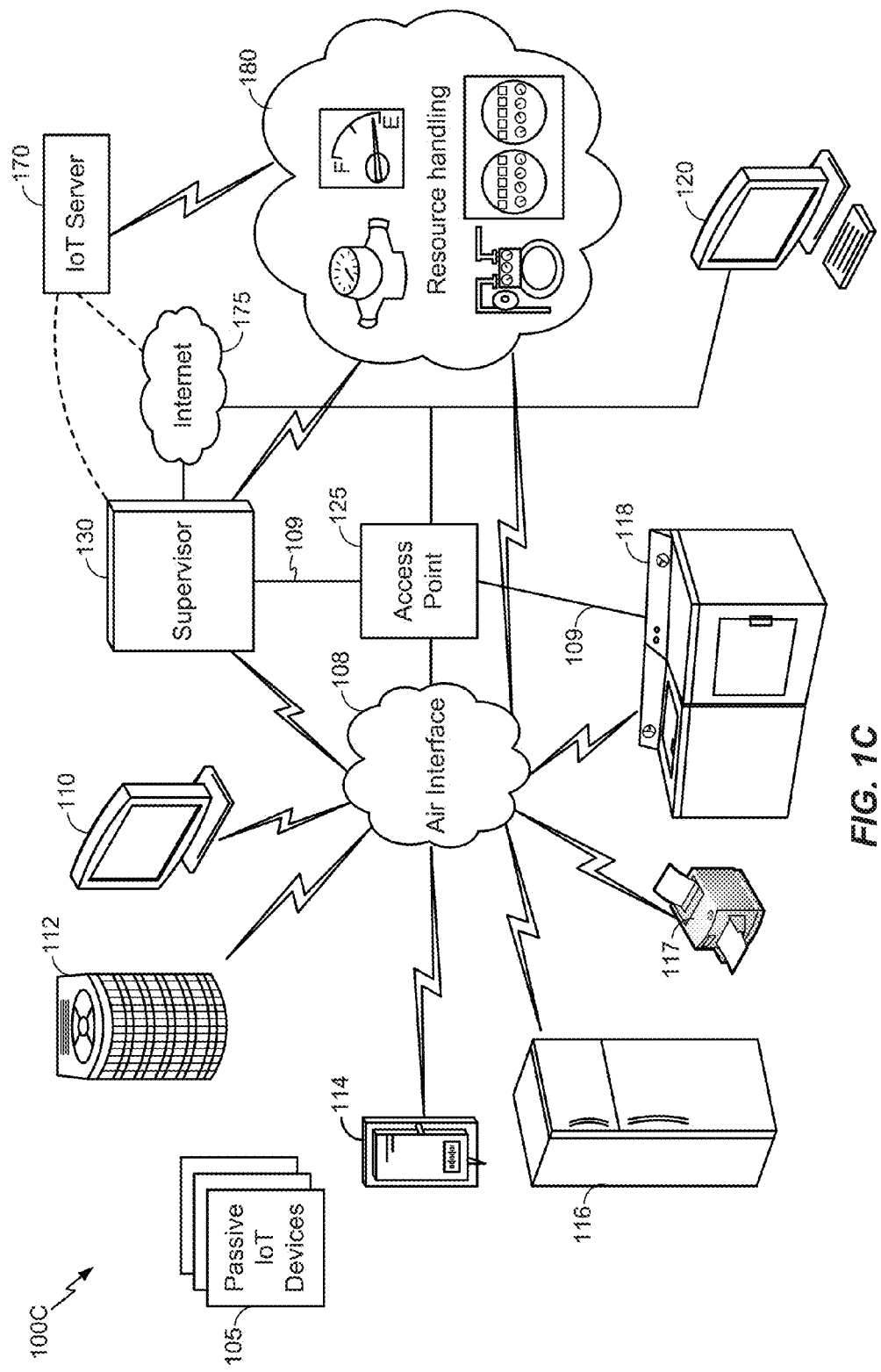
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B, shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively. Also shown in FIG. 1C is a color printer 117, which may generally be observed, monitored, controlled, or otherwise managed. In addition, the color printer 117 may utilize one or more aspects of an enhanced service discovery methodology described further herein in connection with FIGS. 6-9.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1C illustrates several resources 180, such as natural gas, gasoline, hot water, and electricity, wherein the resources 180 can be regulated in addition to and/or over the Internet 175. Embodiments described further herein resources 180 to be quickly discovered by enabling more specific queries for certain desired attributes.

IoT devices can communicate with each other to regulate their use of a resource 180. For example, IoT devices such as a toaster, a computer, and a hairdryer may communicate with each other over a BLUETOOTH communication interface to regulate their use of electricity (the resource 180). As another example, IoT devices such as a desktop computer, a telephone, and a tablet computer may communicate over a WI-FI communication interface to regulate their access to the Internet 175 (the resource 180). As yet another example, IoT devices such as a stove, clothes dryer, and a water heater may communicate over a WI-FI communication interface to regulate their use of gas. Alternatively, or additionally, each IoT device may be connected to an IoT server, such as IoT server 170, which has logic to regulate their use of the resource 180 based on information received from the IoT devices.

Figure 2A:
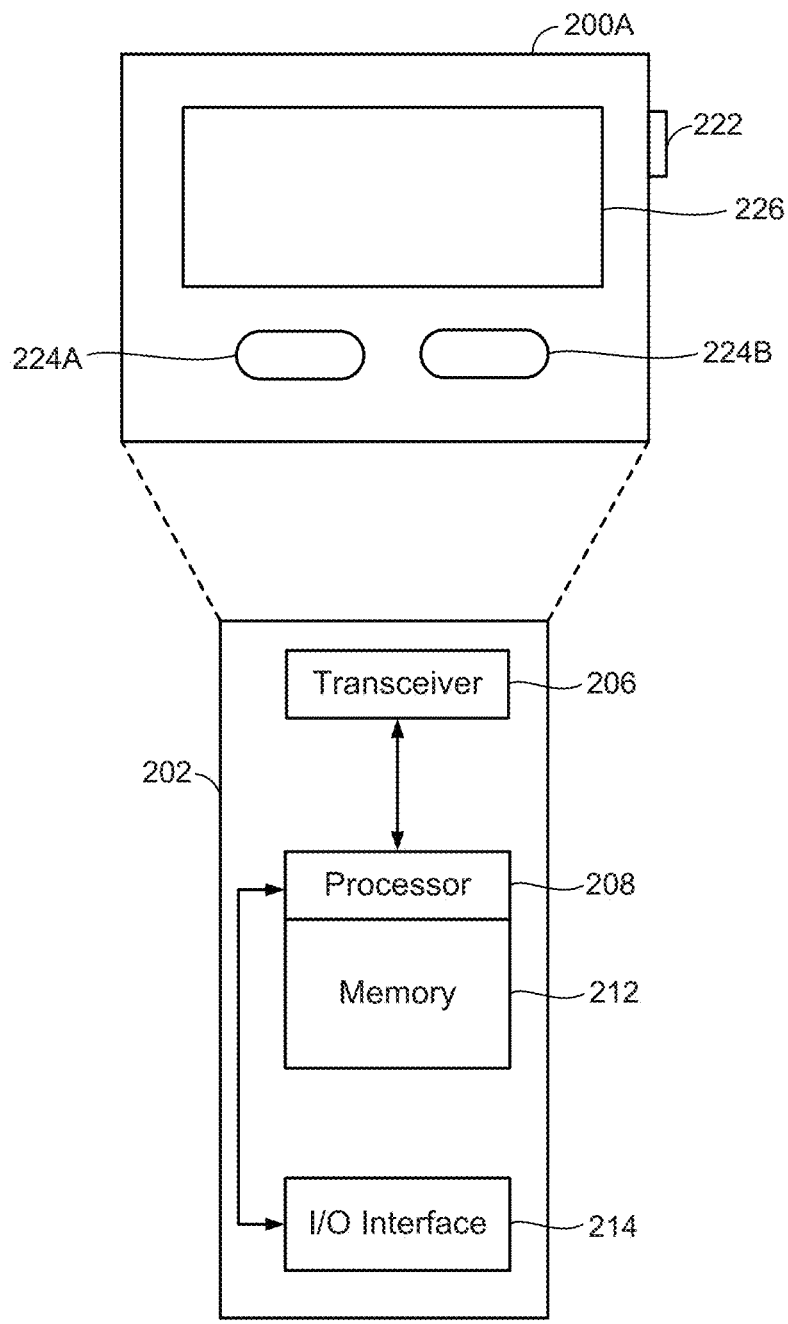

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to WI-FI antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a WI-FI transceiver, a BLUETOOTH transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
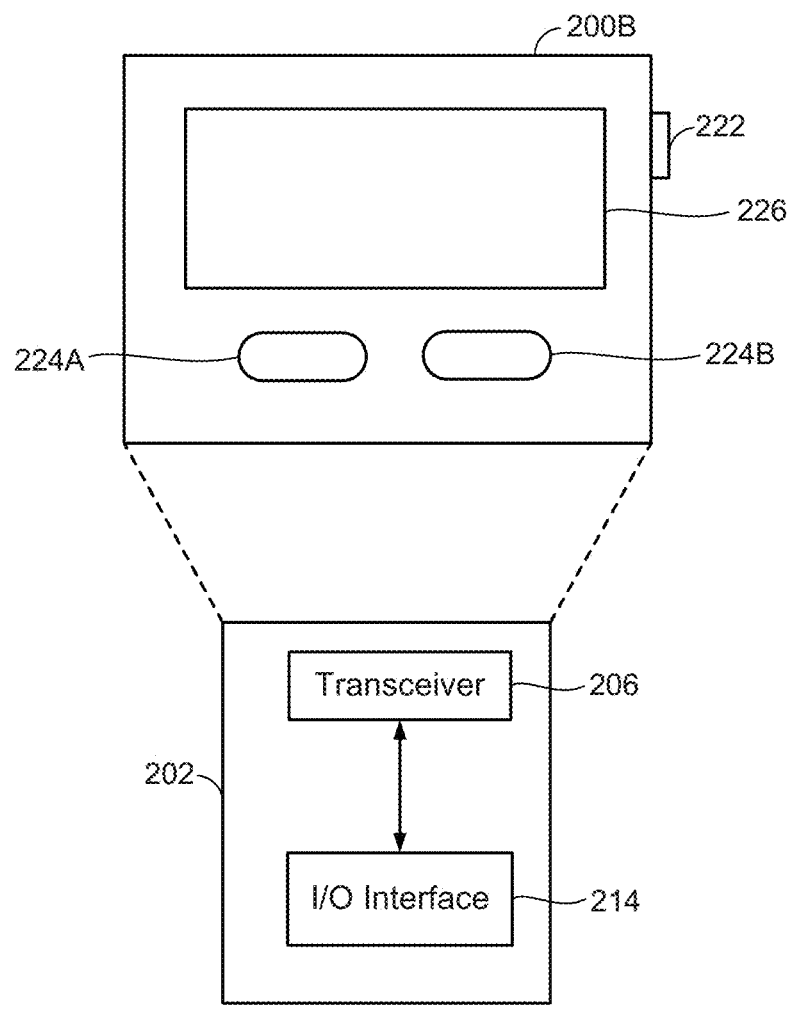
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200A may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, BLUETOOTH interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
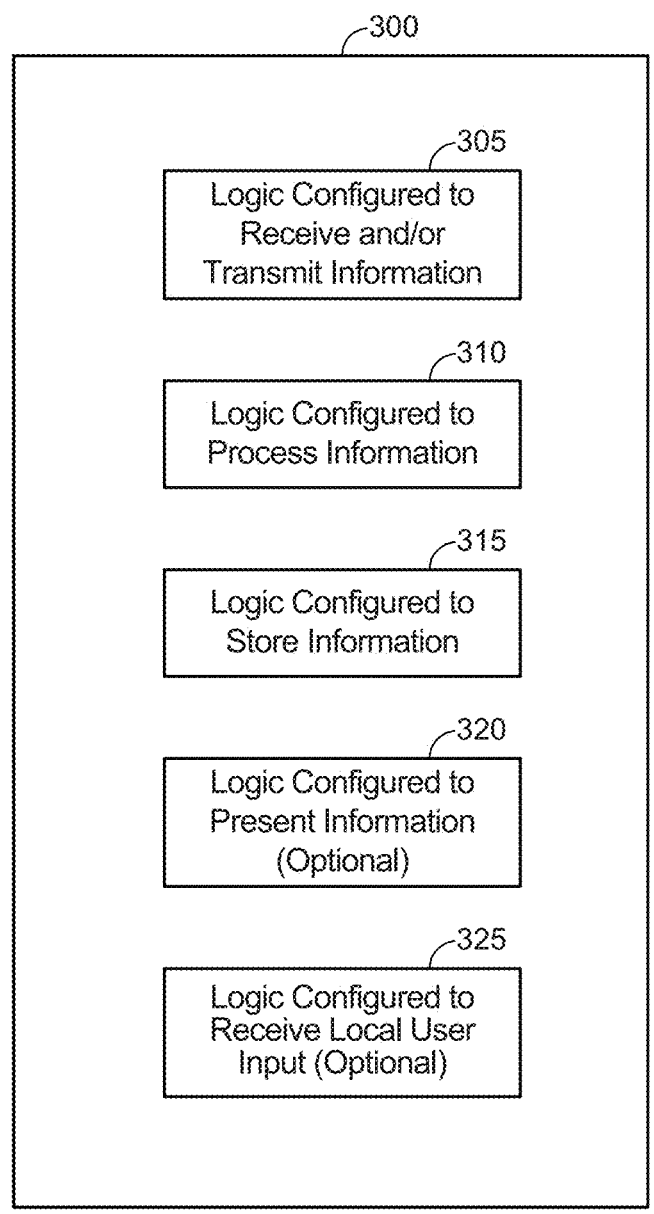
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., BLUETOOTH wireless communications interface, WI-FI wireless communications interface, WI-FI DIRECT wireless communications interface, LONG TERM EVOLUTION (LTE) DIRECT wireless communications interface, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or FIREWIRE connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
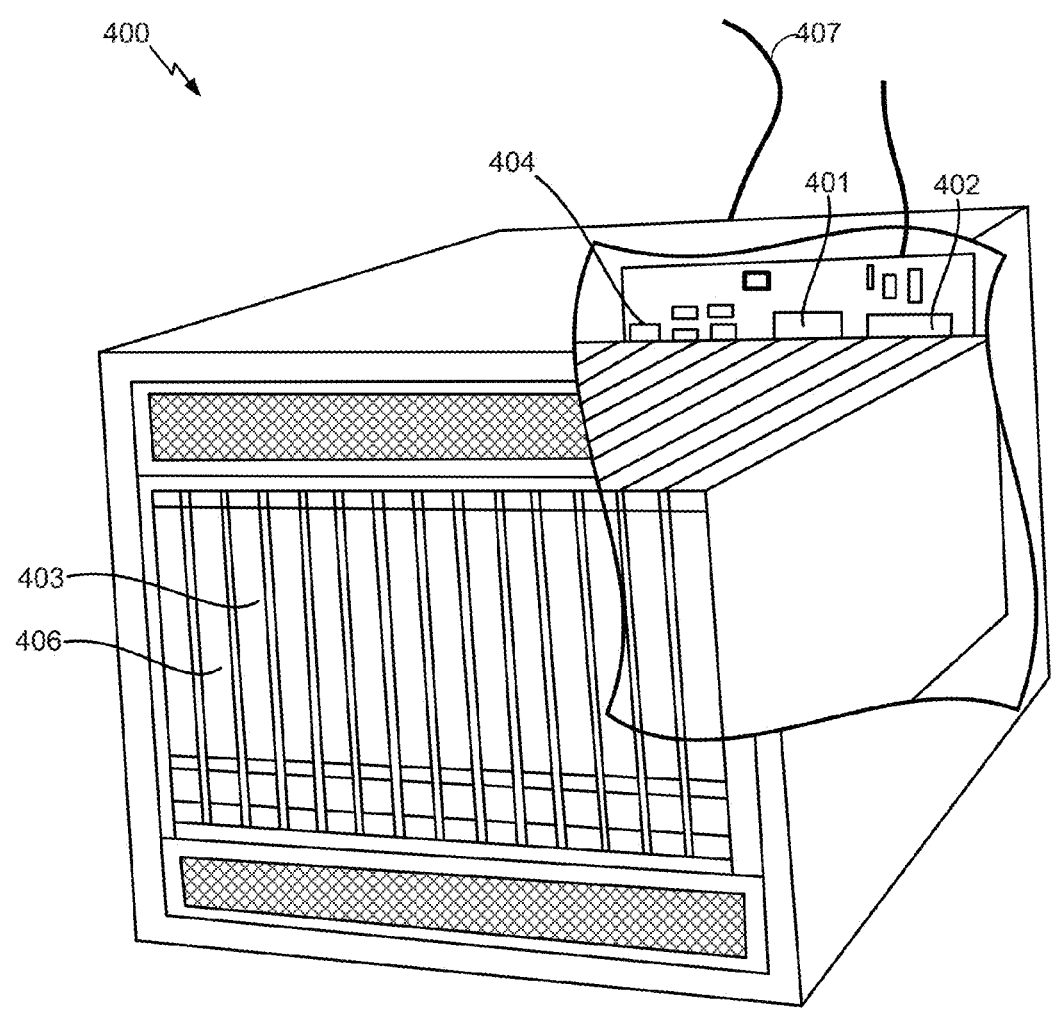
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
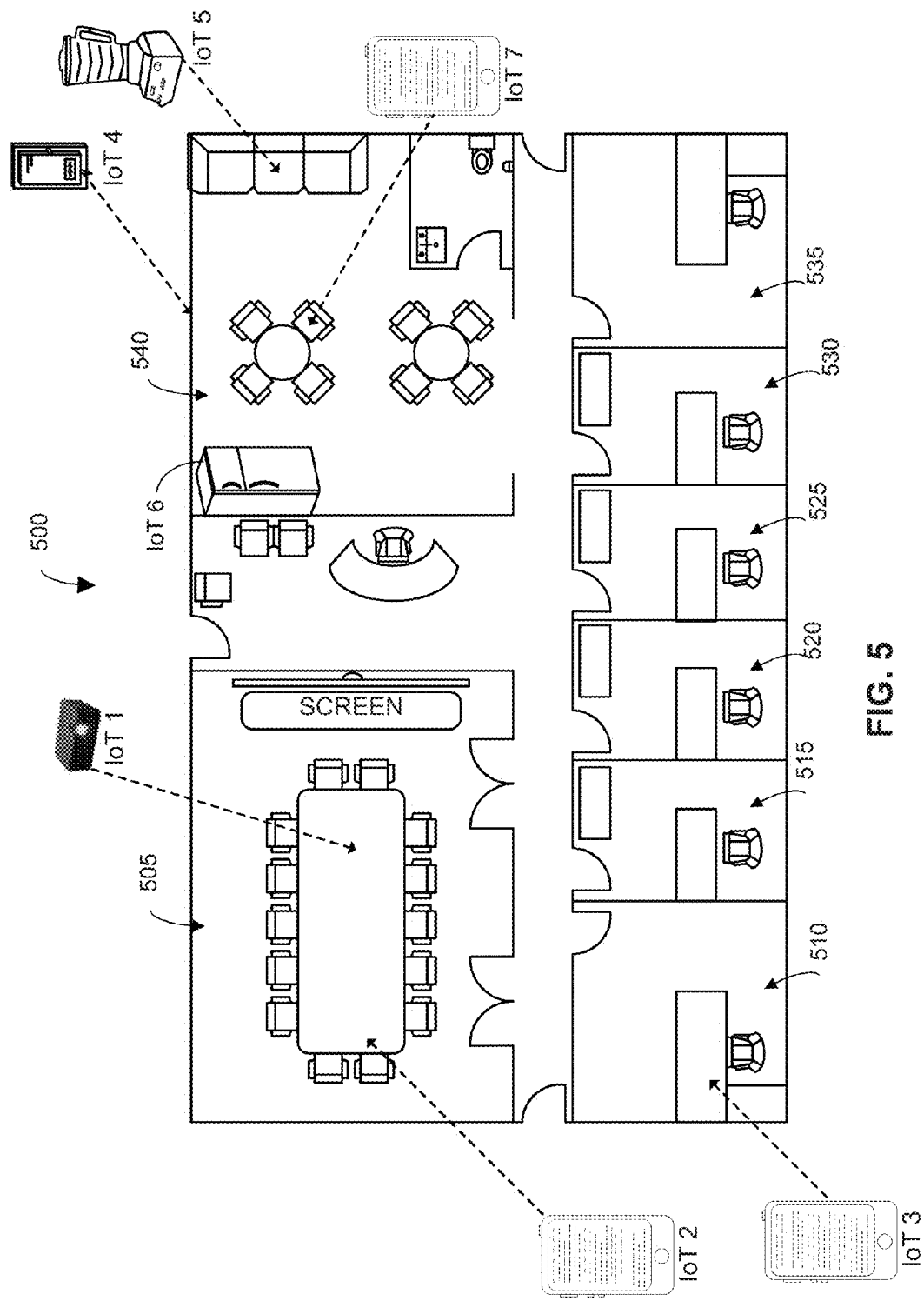
FIG. 5 illustrates an example of an IoT environment 500 in accordance with an embodiment.

FIG. 5 illustrates an example of an IoT environment 500 in accordance with an embodiment of the invention. In FIG. 5, the IoT environment 500 is an office space with a conference room 505, a plurality of offices 510 through 535 and a kitchen 540. Within the office space, IoT device 1 (e.g., a video projector) and IoT device 2 (e.g., a handset device such as a cell phone or tablet computer) are positioned the conference room 505, and IoT device 3 (e.g., a handset device such as a cell phone or tablet computer) is positioned in office 510. Also, IoT device 4 (e.g., a thermostat), IoT device 5 (e.g., a blender), IoT device 6 (e.g., a refrigerator) and IoT device 7 (e.g., a handset device such as a cell phone or tablet computer being operated by an employee on his/her lunch break) are positioned in the kitchen 540. As will be appreciated, while the IoT environment 500 of FIG. 5 is directed to an office, many other configurations of IoT environments are also possible (e.g., residential homes, retail stores, vehicles, stadiums, etc.).

IoT devices are characterized herein as corresponding to either "producer" IoT devices (e.g., IoT devices that produce data for dissemination to other IoT devices) or "consumer" IoT devices (e.g., IoT devices that receive data from a producer IoT device). Examples of producer IoT devices include toasters, ovens, washers, dryers, microwaves, etc., and examples of consumer IoT devices include smart phones, tablet computers, televisions, etc. Certain IoT devices can be producer IoT devices in some contexts and consumer IoT devices in other contexts. For example, a television may be a consumer IoT device when the television receives a notification for presentation thereon (e.g., while watching TV, the TV briefly flashes a "washer has completed wash cycle" notification), and the television may be a producer IoT device when the television has a notification to report to other IoT devices (e.g., that a particular television program has completed its recording, a score update for a television program being viewed, etc.). Consumer IoT devices are configured with a widget that interprets the data received from producer IoT devices for output via a control panel in a display of the consumer IoT devices. The control panel interface can permit a user of the consumer IoT devices to perform certain actions, such as dismissing a notification from view (e.g., a "washer has completed wash cycle" notification can appear in the control panel which is dismissed or canceled by the user), or implementing a control function on a remote producer IoT device (e.g., a "washer has completed wash cycle" notification can appear in the control panel which causes the user to request the washer to transition to a low-heat tumble mode to reduce wrinkles).

As will be appreciated, when consumer devices query the producer devices for available services, each application may independently generate an advertisement message for advertising its respective service in the IoT environment, and each advertisement message is broadcast to all connected devices in the IoT environment (e.g., via BLUETOOTH wireless interface, WI-FI wireless interface, LTE wireless interface, etc.). This can generate a high amount of multicast traffic in the IoT environment. Also, because multicast and broadcast protocols typically do not require feedback (e.g., ACKs or NACKs), each of the service advertisements have relatively low reliability and for this reason are retransmitted at a relatively high frequency, which creates more traffic.

Figure 6:
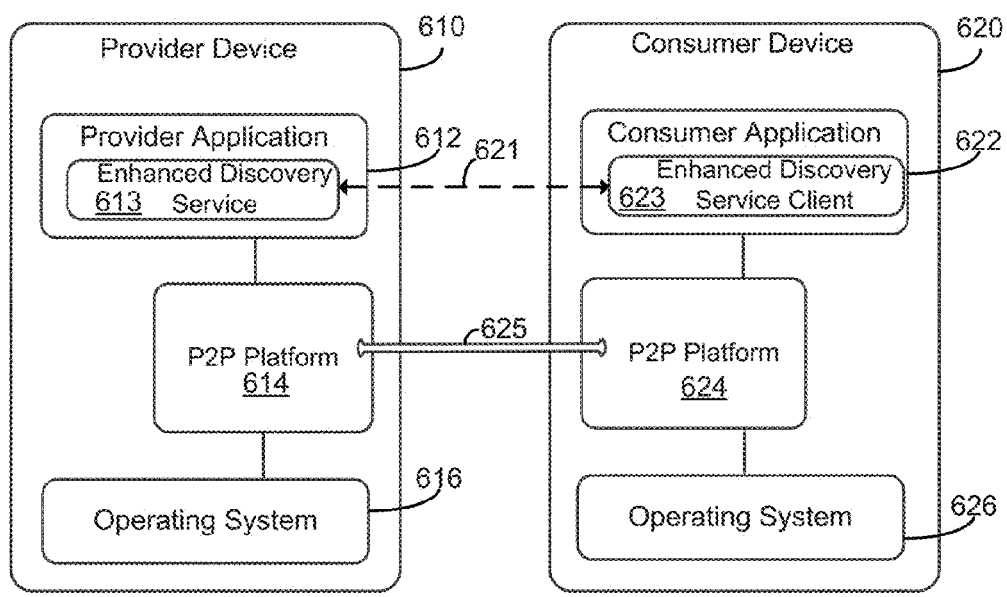
FIG. 6 is a block diagram depicting a system architecture in which discoverable P2P services may be implemented.

According to an aspect of the disclosure, FIG. 6 illustrates a system architecture in which discoverable P2P services (e.g., used over a WI-FI network) may be implemented. As shown in FIG. 6, the system may include a provider device 610 and a consumer device 620. In general, the provider device 610 produces data for dissemination to the consumer device 620. The provider device 610, for example, may be realized as a variety of devices such as thermostats, surveillance cameras, toasters, ovens, washers, dryers, microwaves, etc., and the consumer device 620 may be realized by devices such as smart phones, tablet computers, netbooks, televisions, etc. It should be recognized, however, that the provider device 610 may operate as a provider device in some contexts and as a consumer device in other contexts. Similarly, the consumer device 620 may operate as a consumer device in some contexts and as a provider device in other contexts. For example, if the consumer device 620 is realized by a television, the television may operate as a consumer IoT device when the television inquires about notification services available on a washing machine, and the television may operate as the provider device 610 when the television has a notification service (e.g., that indicates a particular television program has completed its recording) that may be discovered by other devices.

As shown, the provider device 610 and the consumer device 620 may run respective provider and consumer applications 612, 622 that communicate with respective peer-to-peer (P2P) platforms 614, 624 that provide discoverable P2P services. As such, the provider device 610 and the consumer device 620 may communicate with one another using the mechanisms to form a distributed bus 625 that may enable communication between the provider application 612 and consumer application 622. Furthermore, in an embodiment, the provider device 610 and the consumer device 620 may run respective operating systems 616, 626 that run a host "daemon" bus process to handle message routing between the provider device 610 and the consumer device 620. For example, in an embodiment, the respective applications 612, 622 may communicate with the respective host daemons running on the provider device 610 and the consumer device 620, wherein the respective host daemons may implement local segments of the distributed bus 625 and coordinate message flows across the distributed bus 625. Although not required, the P2P platform may operate according to the AllJoyn™ software framework.

In this configuration, an enhanced discovery service client 623 connects with a peer enhanced discovery service 613 via a discovery service application-programming interface (API) 621 that is implemented by the enhanced discovery service client 623 and the enhanced discovery service 613.

As discussed further herein in connection with FIGS. 7-10, the enhanced discovery service client 623 and the enhanced discovery service 613 enable the consumer device 620 to inquire about available services on the provider device 610 (and other devices) using specific service-feature search criteria to narrow responses down to a fewer number of services based upon the search criteria.

The P2P platforms 614, 624 may be implemented as daemons that generally run in one or more background processes, and the provider and consumer applications 612, 622 may run in separate processes, whereby provider and consumer applications 612, 622 may have respective local "bus attachments" that represent the local host daemon and handle message routing therebetween. Alternatively, in certain cases, the provider device 610 may be a thin client, an embedded device, or another device that has a constrained operating environment (e.g., limited size, memory, processor speed, power, peripherals, user interfaces, etc.). For example the provider device 610 may not include the depicted operating system 616. As such, where the provider device 610 has limited capabilities, bundling local bus attachments into each application or service that uses the P2P platform 614 may interfere with performance (e.g., because substantial bus attachments may require substantial network connections, memory, etc.). In these cases, rather than having a local bus attachment within the provider application 612 and/or the enhanced discovery service 613, the provider application 612 may instead employ a thin client application program interface and the P2P platform 614 may instead employ a thin client process that utilizes the host daemon on the consumer device 610 running the consumer application 622. But in either case, the call flows and behaviors that occur between the provider device 610 and the consumer device 620 to provide service information may be substantially the same.

Figure 7:
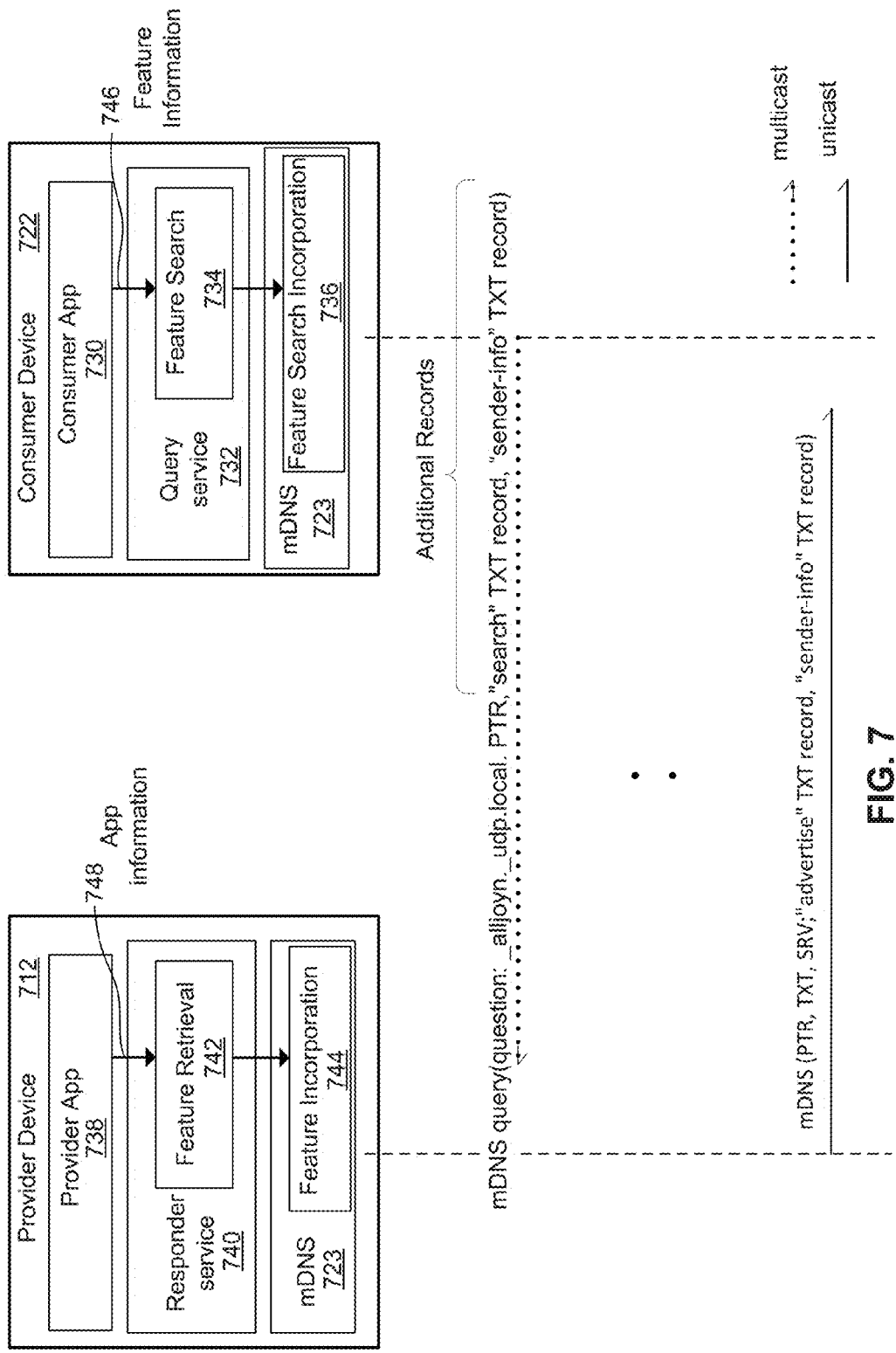
FIG. 7 is a block diagram depicting an embodiment in which the enhanced discovery service and enhanced discovery service client of FIG. 6 are each realized in part by an enhanced multicast domain name service (mDNS).

Referring to FIG. 7, it depicts an embodiment in which the enhanced discovery service 613 and enhanced discovery service client 623 are each realized in part by an enhanced multicast domain name service (mDNS) 723 that is enhanced to enable a consumer device 722 to augment information of interest in a query, and to enable a provider device 712 to provide pertinent information that would not be sent via the existing mDNS service. As shown, the consumer device 722 in this embodiment includes the enhanced mDNS component 723, a consumer app 730, and a query service 732. The query service 732 in this embodiment includes a feature search component 734, and the instance of the enhanced mDNS component 723 in the consumer device 722 includes a feature search incorporation component 736. The provider device 712 also includes an instance of the enhanced mDNS component 723 in addition to a provider app 738, and a responder service 740. The responder service 740 includes an app feature retrieval component 742 and the instance of the enhanced mDNS component 723 on the provider device 712 includes a feature incorporation component 744.

The enhanced mDNS component 723 generally operates consistent with the Network Working Group Request for Comments (RFC) 6763, entitled "DNS-Based Service Discovery," which is incorporated by reference in its entirety. And the message format of RFC 6763 is based upon Network Working Group Request for Comments (RFC) 1035, entitled "DOMAIN NAMES—IMPLEMENTATION AND SPECIFICATION, which is also incorporated by reference in its entirety.

Consistent with RFC 6763 and RFC 1035, the queries and responses are formatted with five sections including: a header section, a question section, and answer section, an authority section, and an additional section. The header includes fields that specify which of the remaining sections are present, and also specify whether the message is a query or a response, a standard query or some other opcode, etc.

The names of the sections after the header are derived from their use in standard queries. The question section contains fields that describe a question to a name server. The last three sections have the same format: a possibly empty list of concatenated resource records (RRs). The answer section contains resource records that answer the question; the authority section contains resource records that point toward an authoritative name server. The additional records section contains resource records, which relate to the query, but RFC 1035 indicates that the resource records in the additional records section in a response "are not strictly answers for the question."

The general format for a typical mDNS query in a multicast environment is:

_service._protocol.local. PTR record.

Problematically, utilizing this known, general format in an environment such as that depicted in FIGS. 1A-1C and FIG. 5 will prompt responses from many IoT devices that the querying device may not be interested in. In particular, to obtain additional information when using a typical mDNS query, the consumer app 730 needs to establish a session with the service instance at a typical provider device to retrieve more information. If the desired information is obtained, then the consumer app 730 may continue to interact with the service instance, but if not, the consumer app 730 will disconnect from the service instance.

As a consequence, to improve over the typical mDNS methodology, in the embodiment depicted in FIG. 7, the consumer app 730 utilizes a feature search component 734 in the query service 732 that is adapted to obtain service-feature information 746 from the consumer app 730, and the feature search incorporation component 736 in the enhanced mDNS component 723 is adapted to incorporate the service-feature information 746 into the additional records section of the query. The service-feature information 746 generally defines attributes of provider apps that the query service 732 is "looking" for. For example, the service-feature information 746 may include key and value pairs, and the keys may include a well-known-name key (e.g., wkn), an interface key, manufacturer key (e.g., manuf), model key, etc. When formatted into the resource records of the additional records section, for example, the additional records section may include the following:

Name="search.<guid>.local." TXT [interface=<>]
Name="search.<guid>.local." TXT [interface=<>, manuf=<>, model=<>]
Name="search.<guid>.local." TXT [wkn=<>]
Name="search.<guid>.local." TXT [wkn=<>, manuf=<>, model=<>]

In the example shown in FIG. 7, a question section of the depicted query includes "alljoyn" as an example of a service name, but it should be recognized that embodiments are not limited to utilizing "alljoyn" as a service name and that any service name corresponding to a service may be utilized in the question section consistent with RFC 6763 and RFC 1035.

In general, the number of resource records in the additional records section is extensible to include multiple keys, but the ability to specify one of among several values for a single key may also provide substantial benefit. Referring to FIG. 7, for example, the additional records section of the depicted query includes a "search" TXT record that may include a well-known-name key or an interface key. The well-known-name key may be an alias to what is called the uniqueName, the actual name for the BusAttachment for the provider app and may be autogenerated by P2P framework upon creation. The interface key may be a key that is generally indicative of attributes of the provider app 738. For example, values of the interface key may be indicative of any properties, events, and actions that are associated with the provider app 738.

In addition, the additional records section also includes a "sender-info" TXT record that may generally include any textual information to assist with service negotiation or session establishment. For example, the sender-info may include an address of the consumer device 722 to enable the provider device 712 to respond to the consumer device 722 with a unicast response. As another example, the sender-info may include a protocol version of software that the consumer device 722 supports.

With respect to properties, an IoT device (e.g., the provider device 610) can have a particular set of attributes and/or properties (e.g., a cooling or heating function, an environmental monitoring or recording function, a light-emitting function, a sound-emitting function, etc.) that can be embedded in and/or controlled/monitored by a central processing unit (CPU), microprocessor, ASIC, or the like.

Events are occurrences of notable actions happening in the system that a provider app (e.g., the provider app 738) may provide information about. Some examples of events that may be detected (e.g., by corresponding sensors) are a temperature exceeding or falling below a threshold, movement of a person, a light turning on, a laundry cycle completing, a door opening, coffee being ready to consume, etc. Events are emitted from event-emitting devices operating as nodes in the network, and the event-emitting device OEM and/or a user may determine what events to emit and what the human readable descriptor to emit for that event.

Actions are physical responses that may be invoked by making a method call to the provider app 738. Examples of actions include actuating a fan, turning on a light, closing a door, turning off a coffee maker, prompting an audible alarm, etc. These actions may be taken in response to a particular event occurring.

As a consequence, the consumer app 730 of a querying device (e.g., the consumer device 620) may send, for example, a query that specifies—by adding a specific interface key to the additional information--properties, events, and/or actions of interest to discover those devices that are relevant to the consumer app 730. If the consumer app 730 is directed to controlling a heating ventilating and air conditioning (HVAC) system for example, the consumer app 730 may specify an interface key in the service-feature information 746 that is associated with temperature transducers. In this way, the consumer app will avoid receiving responses from other IoT devices such as coffee machines and refrigerators.

In the embodiment depicted in FIG. 7, the feature retrieval component 742 of the responder service 740 is adapted to acquire information about the provider app 738 that corresponds to the service-feature information 746 the consumer app 730 is interested in. As depicted, the enhanced mDNS component 723 of the provider device is enhanced with a feature incorporation component 744 that operates to incorporate the app information 748 into the resource records of the additional information section of the response. As shown, the provider app 738 in the embodiment of FIG. 7 is configured to send a unicast response to the consumer device 722 if the provider app 738 meets the criteria defined by the consumer app 730.

As an example use case, if the consumer device 722 is disposed in the environment depicted in FIG. 1C, and the consumer device 722 wants to discover color printers (including the color printer 117) on the local network, the consumer app 730 may add "color=true" in the "search" TXT record of the additional records section of the query along with an address of the consumer device 722 in the "sender-info" TXT portion of the additional records. In response, the color printer 117 may send a unicast message to the consumer device 722, which includes "color=true" in the "advertise" TXT portion of the unicast message. Additionally, the color printer 117 may include a protocol version utilized by software of the color printer 117 in the "sender-info" TXT record of the response.

Figure 8:
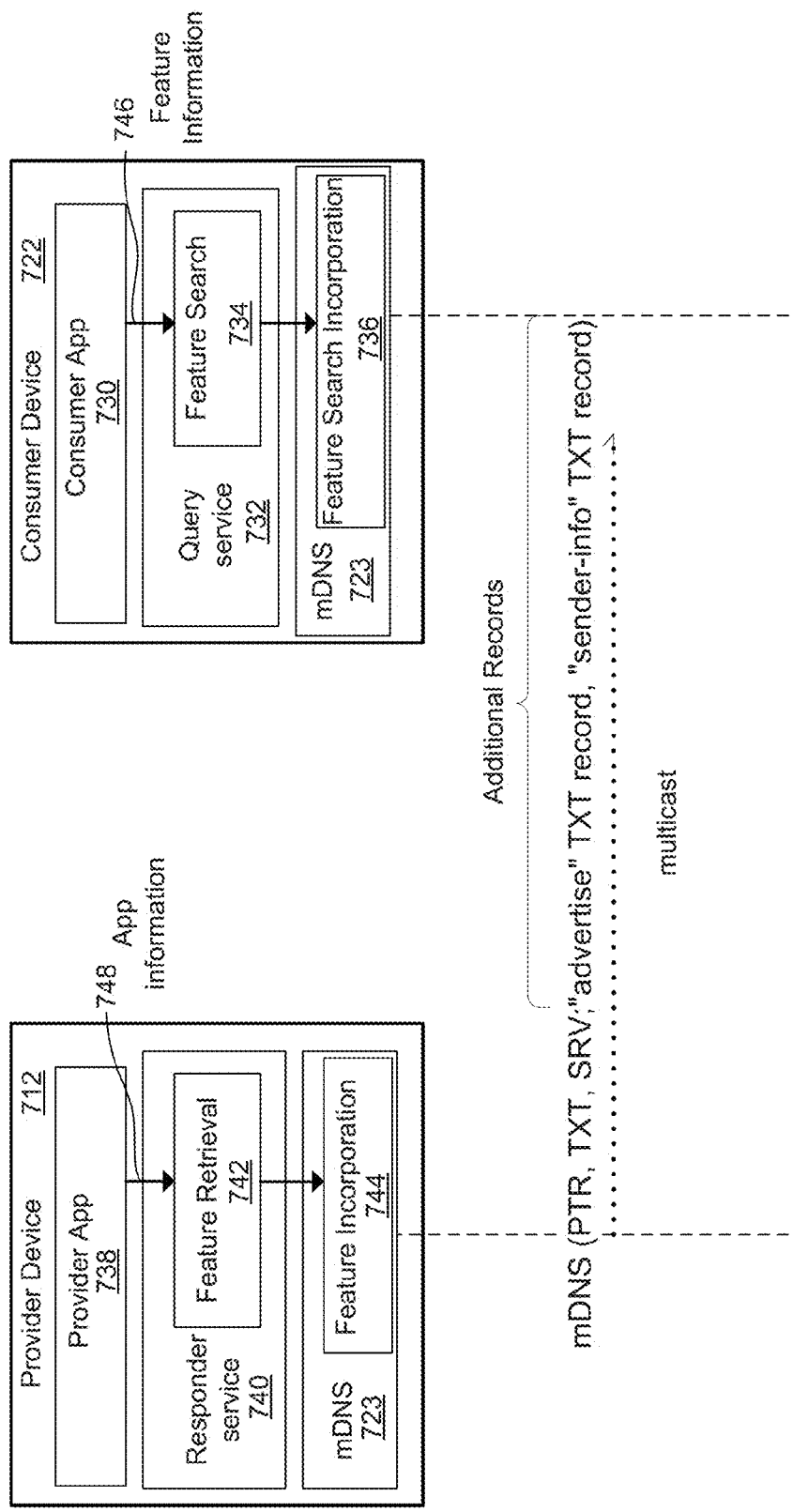
FIG. 8 is a block diagram depicting another embodiment in which the enhanced discovery service and enhanced discovery service client of FIG. 6 are each realized in part by an enhanced multicast domain name service (mDNS).

Referring next to FIG. 8, it depicts similar components as those described with reference to FIG. 7 except that the enhanced mDNS component 723 sends an unsolicited multicast advertisement. Although IoT devices that are not interested in the provider app 738 may receive the multicast advertisement, by virtue of the specific app information 748 incorporated into the additional records of the advertisement, a disinterested IoT device may simply ignore the multicast advertisement. In some modes of operation, the provider device 712 may send unsolicited multicast advertisements that include additional information in the additional records portion of the multicast message. As shown, service information may be included in an "advertise" TXT record to inform other devices about features of an advertised service. In addition, a "sender-info" TXT record may be utilized to generally include any textual information to assist with service negotiation such as a protocol version of software that the provider device 712 supports.

Figure 9:
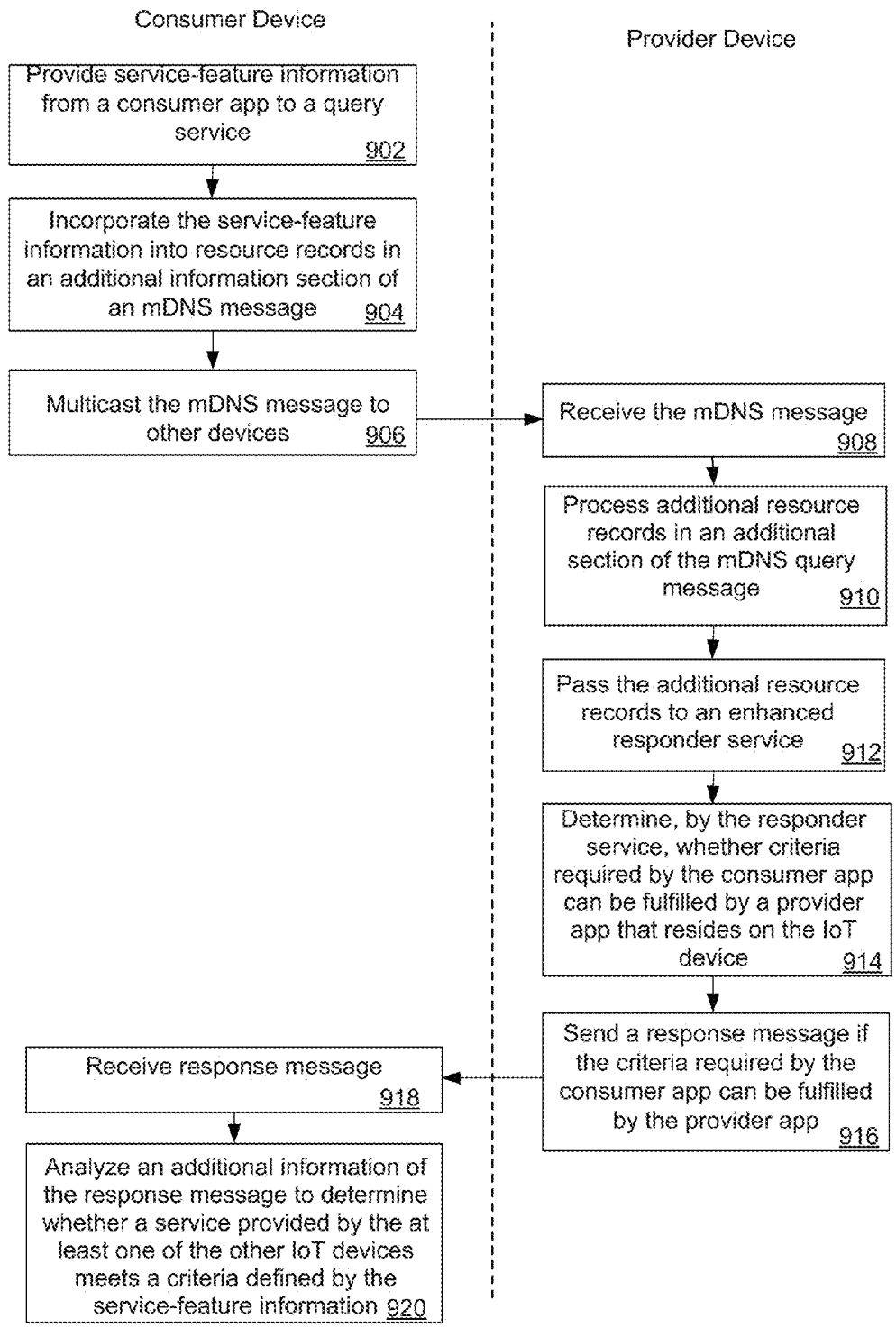
FIG. 9 is a flowchart depicting a method that may be carried out in connection with embodiments disclosed herein.

Referring next to FIG. 9, shown is a flowchart depicting a method that may be carried out in connection with embodiments disclosed herein. As shown, the consumer app 730 may provide service-feature information 746 to the feature search component 734 of the query service 732 (Block 902), and the feature search incorporation component 736 incorporates the service-feature information 746 into resource records in an additional information section of an mDNS message (Block 904). The consumer device 620 then multicasts the mDNS message to other devices (Block 906).

As shown, the provider device 610 receives the mDNS message (Block 908), and processes the additional resource records in the additional section of the mDNS query message (Block 910), and the additional resource records are passed to the responder service 740 (Block 912). As depicted, the responder service 740 utilizes the app information 748 obtained by the feature retrieval component 742 to determine whether criteria required by the consumer app 730 can be fulfilled by the provider app 738 (Block 914). If the criteria required by the consumer app 730 can be fulfilled by the provider app 738, then the responder service 740 prompts the instance of the enhanced mDNS component 723 operating on the provider device 610 to send a response message (Block 916). As shown in FIG. 7, the response message may be unicast, or as shown in FIG. 8, the response message may be multicast.

As depicted, the consumer device 620 receives the response message (Block 918), and analyzes the additional information of the response message to determine whether a service provided by the provider device 610 meets the criteria defined by the service-feature information 746 (Block 920).

Figure 10:
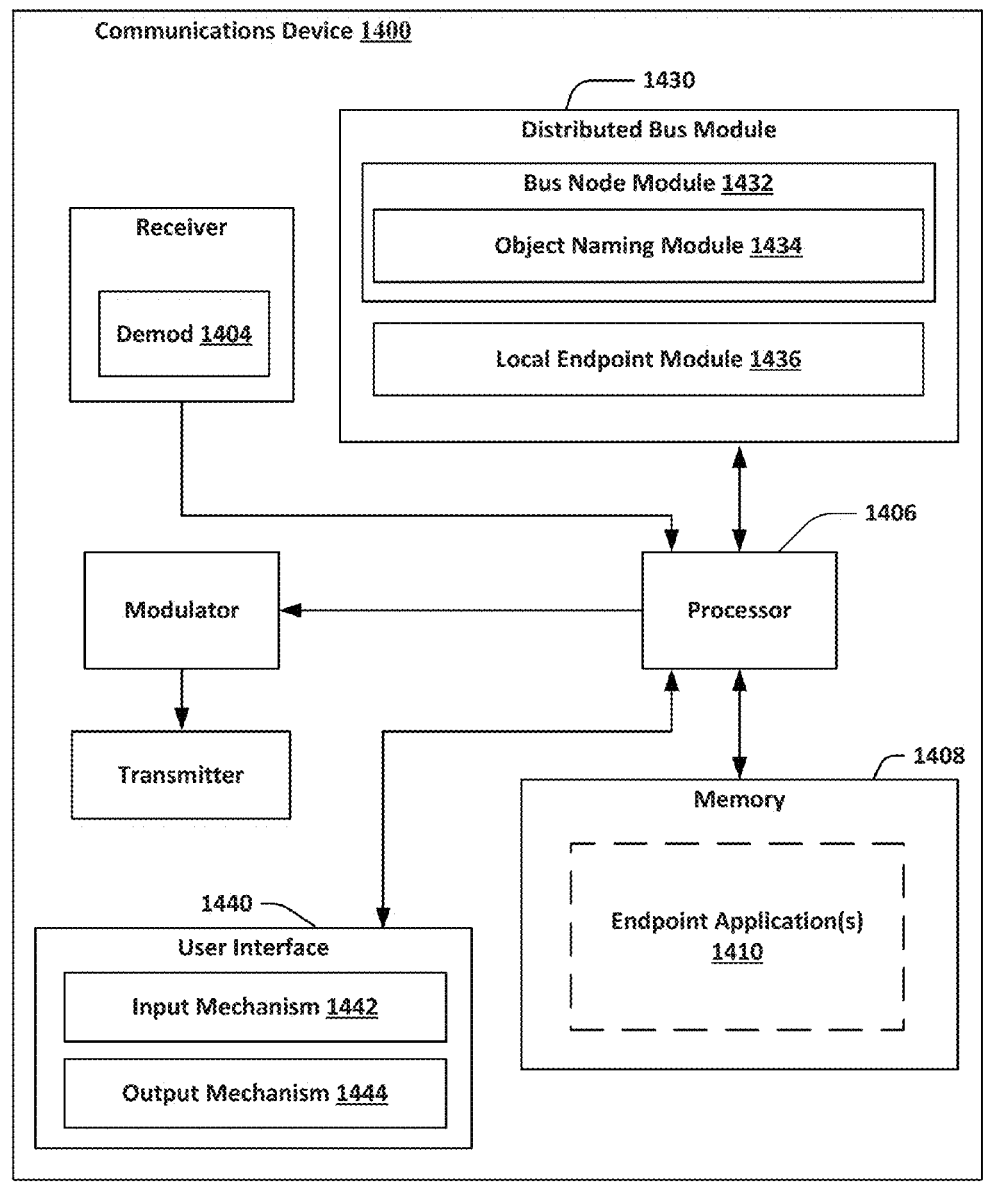
FIG. 10 is a block diagram depicting physical components of an exemplary communication device.

Referring next to FIG. 10, shown is an exemplary communications device 1400 that may correspond to one or more devices that may use P2P services to communicate over a distributed bus and discover services that are available via the distributed bus as described in further detail above. In particular, as shown in FIG. 10, communications device 1400 may comprise a receiver 1402 that may receive a signal from, for instance, a receive antenna (not shown), perform typical actions on the received signal (e.g., filtering, amplifying, downconverting, etc.), and digitize the conditioned signal to obtain samples. The receiver 1402 can comprise a demodulator 1404 that can demodulate received symbols and provide them to a processor 1406 for channel estimation. The processor 1406 can be a processor dedicated to analyzing information received by the receiver 1402 and/or generating information for transmission by a transmitter 1420, a processor that controls one or more components of communications device 1400, and/or a processor that both analyzes information received by receiver 1402, generates information for transmission by transmitter 1420, and controls one or more components of communications device 1400.

Communications device 1400 can additionally comprise a memory 1408 that is operatively coupled to processor 1406 and that can store data to be transmitted, received data, information related to available channels, data associated with analyzed signal and/or interference strength, information related to an assigned channel, power, rate, or the like, and any other suitable information for estimating a channel and communicating via the channel. In one aspect, the memory 1408 can include local endpoint applications 1410, which may seek to communicate with endpoint applications, services etc., on communications device 1400 and/or other communications devices 1400 associated through distributed bus module 1430. Memory 1408 can additionally store protocols and/or algorithms associated with estimating and/or utilizing a channel (e.g., performance based, capacity based, etc.).

It will be appreciated that data store (e.g., memory 1408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1408 of the subject systems and methods may comprise, without being limited to, these and any other suitable types of memory.

Communications device 1400 can further include distributed bus module 1430 to facilitate establishing connections with other devices, such as communications device 1400. Distributed bus module 1430 may further comprise bus node module 1432 to assist distributed bus module 1430 managing communications between multiple devices. In one aspect, a bus node module 1432 may further include object naming module 1434 to assist bus node module 1432 in communicating with endpoint applications 1410 associated with other devices. Still further, distributed bus module 1430 may include endpoint module 1436 to assist local endpoints in communicating with other local endpoints and/or endpoints accessible on other devices through an established distributed bus. In another aspect, distributed bus module 1430 may facilitate inter-device and/or intra-device communications over multiple available transports (e.g., BLUETOOTH wireless interface, UNIX domain-sockets, TCP/IP, WI-FI wireless interfaces, etc.).

Additionally, in one embodiment, communications device 1400 may include a user interface 1440, which may include one or more input mechanisms 1442 for generating inputs into communications device 1400, and one or more output mechanisms 1444 for generating information for consumption by the user of the communications device 1400. For example, input mechanism 1442 may include a mechanism such as a key or keyboard, a mouse, a touch-screen display, a microphone, etc. Further, for example, output mechanism 1444 may include a display, an audio speaker, a haptic feedback mechanism, a Personal Area Network (PAN) transceiver etc. In the illustrated aspects, the output mechanism 1444 may include an audio speaker operable to render media content in an audio form, a display operable to render media content in an image or video format and/or timed metadata in a textual or visual form, or other suitable output mechanisms. However, in one embodiment, a headless communications device 1400 may not include certain input mechanisms 1442 and/or output mechanisms 1444 because headless devices generally refer to computer systems or device that have been configured to operate without a monitor, keyboard, and/or mouse.

Additional details that relate to the aspects and embodiments disclosed herein are described and illustrated in the Appendices attached hereto, the contents of which are expressly incorporated herein by reference in their entirety as part of this disclosure.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An Internet of Things (IoT) device comprising:
    a processor;
    a transceiver; and
    memory coupled to the processor including program-executable instructions, which when executed by the processor, cause the IoT device to:
    provide service-feature information from a consumer app of the IoT device that defines attributes of a provider app to be utilized as search criteria, the attributes including at least one event and at least one action that are associated with the provider app;
    incorporate the service-feature information as multiple key and value pairs in a search TXT record included in an additional information section of a multicast Domain Name System (mDNS) message;
    multicast, using the transceiver, the mDNS message from the IoT device to other IoT devices;
    receive, using the transceiver, at least one response message from a provider IoT device; and
    analyze an additional information section of the at least one response message to determine whether a provider app of the provider IoT device meets the search criteria defined by the service-feature information provided by the consumer app.

2. The IoT device of claim 1, wherein the mDNS message includes any service name consistent with RFC 6763 and RFC 1035 in a question section of the mDNS message.

3. The IoT device of claim 1, wherein the mDNS message includes sender information identifying the consumer IoT device as a key and value pair in a sender-info TXT record included in the additional information section.

4. The IoT device of claim 1, wherein the key and value pairs include at least one of name, manufacture, model, protocol version, and capability information.

5. A method of operating at least one Internet of Things (IoT) device deployed in a local IoT environment, comprising:
    providing service-feature information from a consumer app of a consumer IoT device that defines attributes of a provider app to be utilized as search criteria, the attributes including at least one event and at least one action that are associated with the provider app;
    incorporating the service-feature information, as multiple key and value pairs in a search TXT record included in an additional information section of a multicast Domain Name System (mDNS) message;
    multicasting the mDNS message from the consumer IoT device to other IoT devices;
    receiving at least one response message from a provider IoT device; and
    analyzing an additional information section of the at least one response message to determine whether a provider app of the provider IoT device meets the search criteria defined by the service-feature information provided by the consumer app.

6. The method of claim 5, further comprising:
    receiving the mDNS message at the provider IoT device;
    obtaining, by the provider IoT device, the service-feature information from the mDNS message;

determining, by the provider IoT device, whether the search criteria defined by the service-feature information can be fulfilled by a provider app that resides on the provider IoT device; and sending, by the provider IoT device, a response message if the search criteria defined by the service-feature information can be fulfilled by the provider app.

7. The method of claim 6, wherein the mDNS message includes sender information identifying the consumer IoT device as a key and value pair in a sender-info TXT record included in the additional information section.

8. The method of claim 7, wherein sending a response message comprises unicasting a response message from the provider IoT device to the consumer IoT device identified by the sender information.

9. The method of claim 6 further comprising periodically multicasting, from the provider IoT device, unsolicited advertisements, each unsolicited advertisement incorporating app information of the provider app as key and value pairs in an advertise TXT record provided in an additional information section of an mDNS.

10. A non-transitory, tangible processor readable storage medium, encoded with processor readable instructions to perform a method for discovering services, the method comprising:

providing service-feature information from a consumer app of a consumer IoT device that defines attributes of a provider app to be utilized as search criteria, the attributes including at least one event and at least one action that are associated with the provider app;

incorporating the service-feature information as the multiple key and value pairs in a search TXT record included in an additional information section of a multicast Domain Name System (mDNS) message;

multicasting the mDNS message from the consumer IoT device to other IoT devices;

receiving at least one response message from a provider IoT device; and analyzing an additional information section of the at least one response message to determine whether a provider app of the provider IoT device meets the search criteria defined by the service-feature information provided by the consumer app.

11. The non-transitory, tangible processor readable storage medium of claim 10, wherein the method further comprises:

receiving the mDNS message at the provider IoT device;

obtaining, by the provider IoT device, the service-feature information from the mDNS message;

determining, by the provider IoT device, whether the search criteria defined by the service-feature information can be fulfilled by a provider app that resides on the provider IoT device; and sending, by the provider IoT device, a response message if the search criteria defined by the service-feature information can be fulfilled by the provider app.

12. The non-transitory, tangible processor readable storage medium of claim 11, wherein the mDNS message includes sender information identifying the consumer IoT device as a key and value pair in a sender-info TXT record included in the additional information section.

13. The non-transitory, tangible processor readable storage medium of claim 12, wherein sending a response message comprises unicasting a response message from the provider IoT device to the consumer IoT device identified by the sender information.

14. The non-transitory, tangible processor readable storage medium of claim 11, wherein the method further comprises periodically multicasting, from the provider IoT device, unsolicited advertisements, each unsolicited advertisement incorporating app information of the provider app as key and value pairs in an advertise TXT record provided in an additional information section of an mDNS message.

* * * * *